Nov. 3, 1931.   F. GRAY   1,830,163
GLOW DISCHARGE LAMP
Filed Sept. 30, 1926
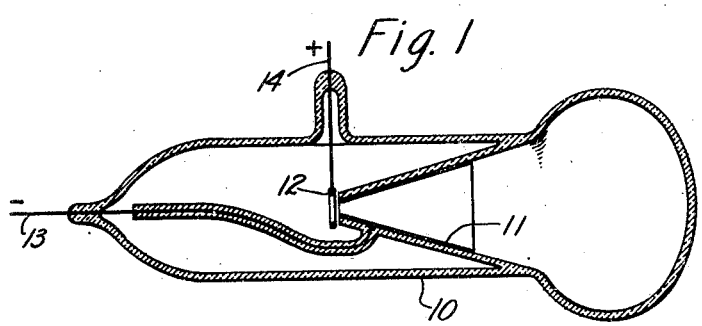
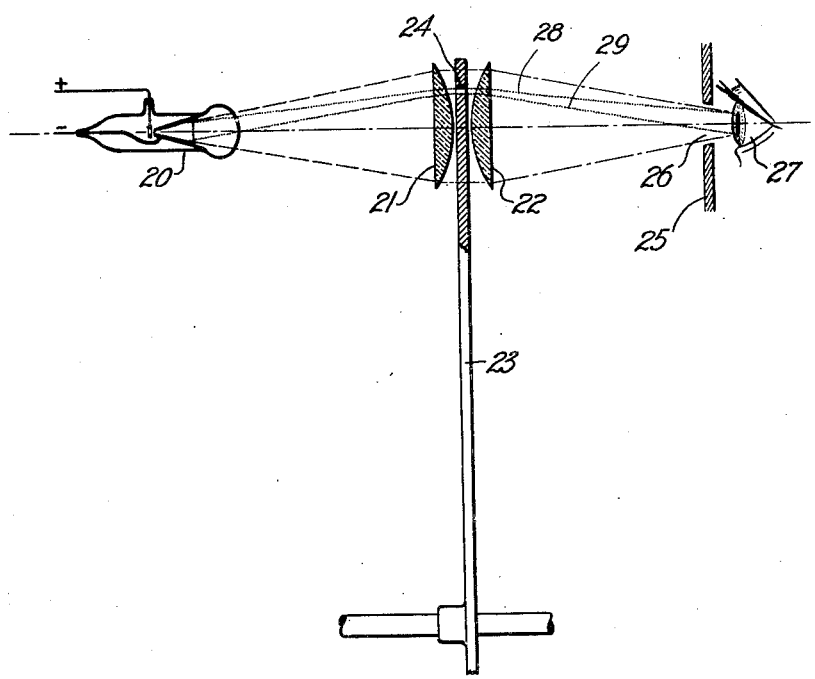
Inventor:
Frank Gray
by Joel X. Palmer Atty Patented Nov. 3, 1931

1,830,163

UNITED STATES PATENT OFFICE

FRANK GRAY, OF NEW YORK, N. Y., ASSIGNOR TO BELL TELEPHONE LABORATORIES, INCORPORATED, OF NEW YORK, N. Y., A CORPORATION OF NEW YORK

GLOW DISCHARGE LAMP

Application filed September 30, 1926. Serial No. 138,618.

This invention relates to glow discharge methods and apparatus and more particularly to a glow discharge lamp which may be used for various purposes and is especially suited for use in television systems.

This application is a continuation in part of a copending application of F. Gray, Serial No. 119,550, filed June 30, 1926.

The general object of this invention is to improve the light emitting characteristics of a glow discharge lamp. This object is attained in a preferred embodiment of this invention by causing a glow discharge to take place on the inside of an open ended hollow truncated conical shaped cathode. An anode, preferably in the form of a magnesium ring, is located at the small end of the cathode in close proximity thereto. The discharge begins at the apex of the cone and spreads towards the base, varying in area and in light density as the impressed potential increases until the entire cathode is covered, after which the density alone increases. Substantially all the light emitted from such a discharge emerges from the large end of the cathode in a fairly well defined conical beam, which can be efficiently controlled by lenses or mirrors constituting the scanning mechanism of a television system. The glow is produced with a small expenditure of electrical energy in proportion to the output of useful light, resulting in an efficient system.

A preferred type of optical system for television reception comprises a split compound spherical lens between the two halves of which rotates an apertured scanning disc. The eye of the observer is positioned at a normal viewing distance from the disc, the proper position being fixed by an aperture in an opaque screen. A lamp having a conical cathode is placed at a focus of the lens system which focus is conjugate with respect to a focus where the eye is located, the large end of the cathode being turned toward the disc and the spread of the cone being such that substantially all the emitted light falls upon the lens surface covering the area being scanned at the scanning disc.

The optical system of this invention is well suited for use at the receiving terminal of the television system disclosed in a copending application of F. Gray, Serial No. 111,731, filed May 26, 1926. The method of combining the two arrangements is obvious.

A more detailed description of the invention follows and is illustrated in the accompanying drawings.

Fig 1 is a longitudinal section of a glow discharge lamp embodying the present invention.

Fig. 2 is a schematic arrangement of an optical system for which this lamp is especially adapted.

As shown in Fig. 1 the lamp consists essentially of a sealed glass tube 10, containing neon or other suitable gas at the proper pressure, a small truncated conical shaped cathode 11 open at both its bases, and an anode 12 in the shape of a ring or a plate, or of other convenient form, placed behind the smaller end of the cone. Electrical connection is made with each of these electrodes by means of the negative and positive leads 13 and 14, respectively. In order to confine the glow discharge to the inside of the cone 11 its outer surface is covered with insulating material, such as glass, and for the same reason the lead-in wire 13 is also covered with a glass tube which surrounds it within the lamp.

Nickel, tungsten or other suitable metal may be used for the electrodes and it may be convenient to use a magnesium anode so that it can also be used to clean up the neon gas by the simple expedient of operating the tube backwards. It is desirable to have the inside surface of the cathode polished or bright to aid in reflecting the light, and for this purpose a surface of polished tungsten or other similar material is preferable. The pressure of the gas within the tube is usually such that minimum sparking voltage is obtained. Alteration of light intensity, color or electrical characteristics of the tube may be obtained by modifying the gas filling and by using electrodes of various metals including those strongly alkali such as sodium, potassium, lithium, magnesium and the like, particularly for the cathode.

The construction of this lamp is such as to concentrate the light within the conical cathode 11 and to operate with a very small current. The light intensity is great and the source is of small size and consequently the lamp is particularly adapted to a television system, which requires efficient use of the available light.

Fig. 2 shows the essential elements of a television receiving device in which this lamp may be used. The principal elements are a small lamp 20 of the type shown in Fig. 1 a pair of lenses 21 and 22, a scanning disc 23 having a series of small apertures 24 arranged in spiral form near the periphery of the disc in such positions that only one of the apertures is in the light path and field of view at any given instant, and a screen 25 having an aperture 26 through which the picture may be viewed. The screen 25 is primarily used for indicating where the observer should position his eye 27.

For best results it is essential to utilize substantially all the light passing through the lens system and the light can be so utilized only if all the light is caused to enter through the pupil of the observer's eye. This result is accomplished by choosing such lenses and so positioning the lamp 20 and the observer's eye that an image of the large end of the conical cathode of the lamp 20 is formed at the pupil of the observer's eye and approximately of the same size as the pupil. The path of the light from the lamp to the eye of the observer through an aperture in the scanning disc is indicated by the lines 28 and 29. In order to give the observer some freedom of movement of the pupil of his eye around the axis of the lens system without sacrificing too must light the image of the light source is preferably made somewhat larger than the pupil.

Since the picture is built up by bundles of rays proceeding from the various elemental areas of the observed field in which the picture is formed, the observer will naturally focus his eye so that each bundle will produce a clearly defined image of this elemental area on the retina. In doing this he will focus on or near the plane of the scanning disc. In view of this the screen 25 is so located that the observer's eye is at approximately the normal reading distance from the scanning disc. The built up picture can thus be clearly seen with a minimum of effort on the part of the focussing muscles of the eye.

In a particular arrangement which has given good results the screen 25 is placed at approximately 8 inches from the scanning disc 23. The lenses 21 and 22 are 1½ inches in diameter and have a focal length of 3 inches. A glow discharge lamp having a conical cathode whose large end measures ⅛ inch in diameter is placed at approximately 4.8 inches from the disc. This cathode measures approximately ½ inch from the small end to the large end, the small end having a diameter of approximately $\frac{1}{16}$ inch Under these conditions the image of the large end of the cone at a distance of 8 inches from the disc is approximately ⅕ inch in diameter.

The invention disclosed herein is obviously susceptible to various modifications and adaptations without departing from the scope and spirit of the invention and it is not intended to limit the invention to the specific structure herein shown and described, except as defined by the appended claims.

What is claimed is:

1. A glow discharge lamp including a cathode having a conical shaped member or depression therein and an anode positioned close to but out of contact with the innermost portion of the walls of said chamber.

2. A glow discharge lamp including a conical shaped cathode open at both ends and an anode positioned at the smaller end of the said cathode.

3. A glow discharge lamp having a truncated conical shaped hollow cathode and an anode associated with the smaller end thereof, said cathode being insulated on its exterior surface thereby confining the glow discharge to the inner surface thereof.

4. A glow discharge lamp including a conical shaped cathode open at both ends insulating material covering the outer area of the said cathode, insulating material covering the lead-in wire connected with said cathode, and an anode positioned near the smaller end of said cathode.

5. A glow discharge lamp including a cathode having a conical shaped chamber or depression therein, an anode positioned close to but out of contact with the innermost portion of the walls of said chamber, and an inert gas surrounding the said electrodes, the said gas having such a pressure as to give minimum sparking voltage.

6. A glow discharge lamp having a cathode of metal with a high fusion point and a conical opening therein, and an anode of an alkali metal in proximity to only one end of said cathode opening.

7. A glow discharge lamp comprising an electrode containing a chamber or depression within which the light is produced and from which it emerges through an opening in the walls thereof, the walls of said chamber being generally divergent towards said opening and highly polished, said electrode being of metal which is capable of retaining a polish upon a discharge surface, and a second electrode positioned close to but out of contact with the innermost portion of the walls of said chamber.

8. A glow discharge lamp comprising a cathode containing a chamber or depression within which the light is produced and from which it emerges through an opening in the walls thereof, the walls of said chamber being generally divergent toward said opening, an anode near a portion of said cathode remote from said opening and symmetrically positioned with respect thereto, and an inert gas surrounding said electrodes and having such pressure as to cause a discharge to occur between the anode and distant portions of the cathode.

9. A glow discharge lamp including a cathode having a conical shaped opening therein, and an anode positioned close to but out of contact with the small end of the cathode opening.

10. A glow discharge lamp including a cathode having a conical shaped opening therein, and an anode positioned close to but out of contact with the small end of the cathode opening, each of the electrodes being of metal having a high fusion point and at least one of said electrodes comprising alkali metal.

11. A glow discharge lamp comprising a cathode containing a chamber or depression within which the light is produced and from which it emerges from an opening in the walls thereof, the walls of said chamber being generally divergent towards said opening from the portion of said wall most remote from said opening, and an anode near said remote portion of said cathode and symmetrically positioned with respect to said cathode.

12. A glow discharge lamp comprising a hollow cathode having a small opening and a large opening therein, the walls of said cathode being generally divergent from said small opening to said large opening, and an anode associated with said small opening, said cathode being insulated on its exterior surface thereby confining the glow discharge to the inner surface thereof.

13. A glow discharge lamp comprising a cathode containing a chamber or depression within which the light is produced and from which it emerges from an opening in the walls thereof, the walls of said chamber being generally divergent toward said opening, and an anode close to but out of contact with the innermost portion of the walls of said chamber, said cathode being of metal with a high fusion point and the active portion at least of said anode being of an alkaline metal.

In witness whereof, I hereunto subscribe my name this 28th day of September, A. D. 1926.

FRANK GRAY.